July 11, 1933.  V. J. BURNELLI  1,917,428
AIRCRAFT
Original Filed Dec. 17, 1927   3 Sheets-Sheet 2
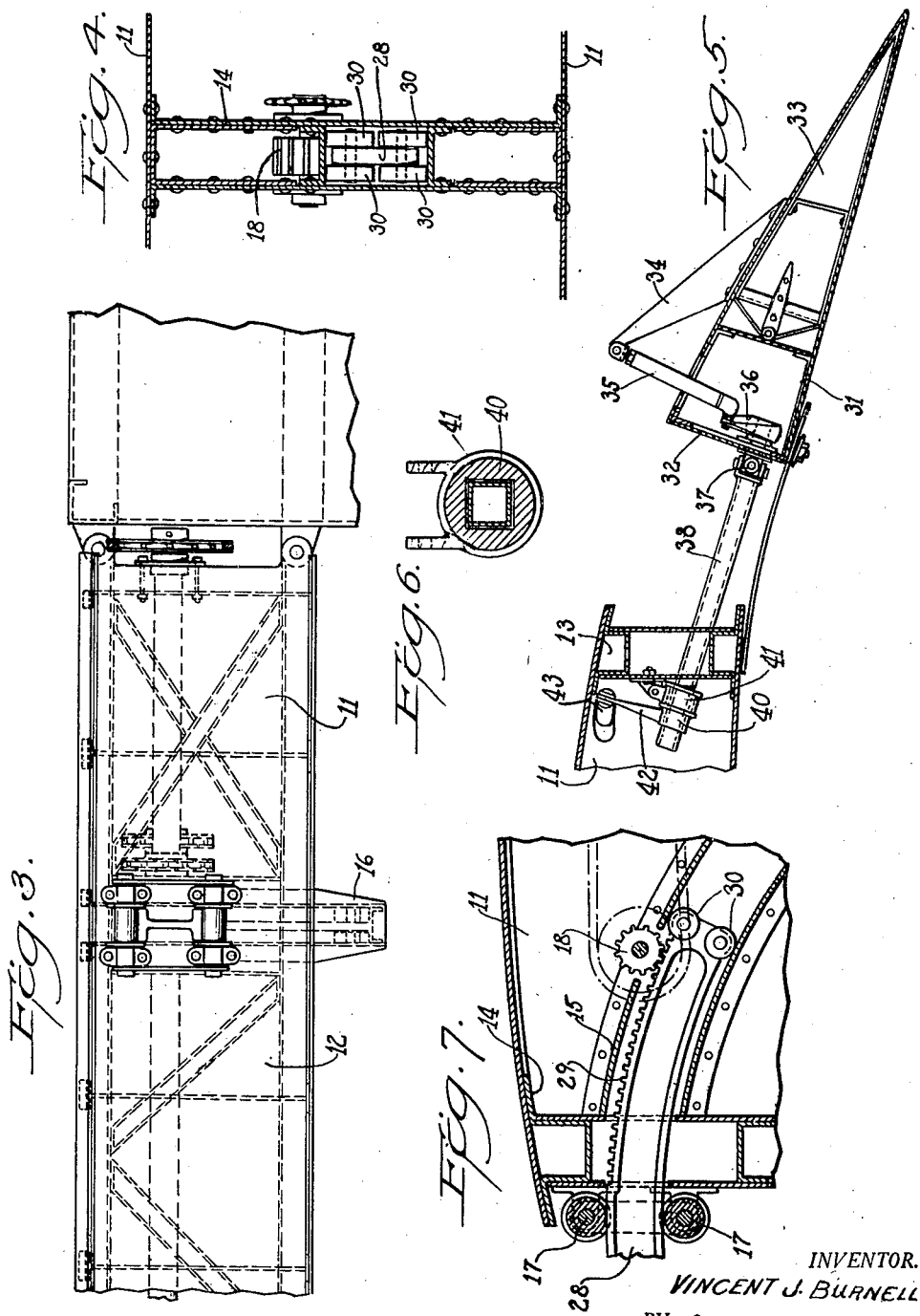
INVENTOR.
VINCENT J. BURNELLI
BY Frank H. Borden
ATTORNEY

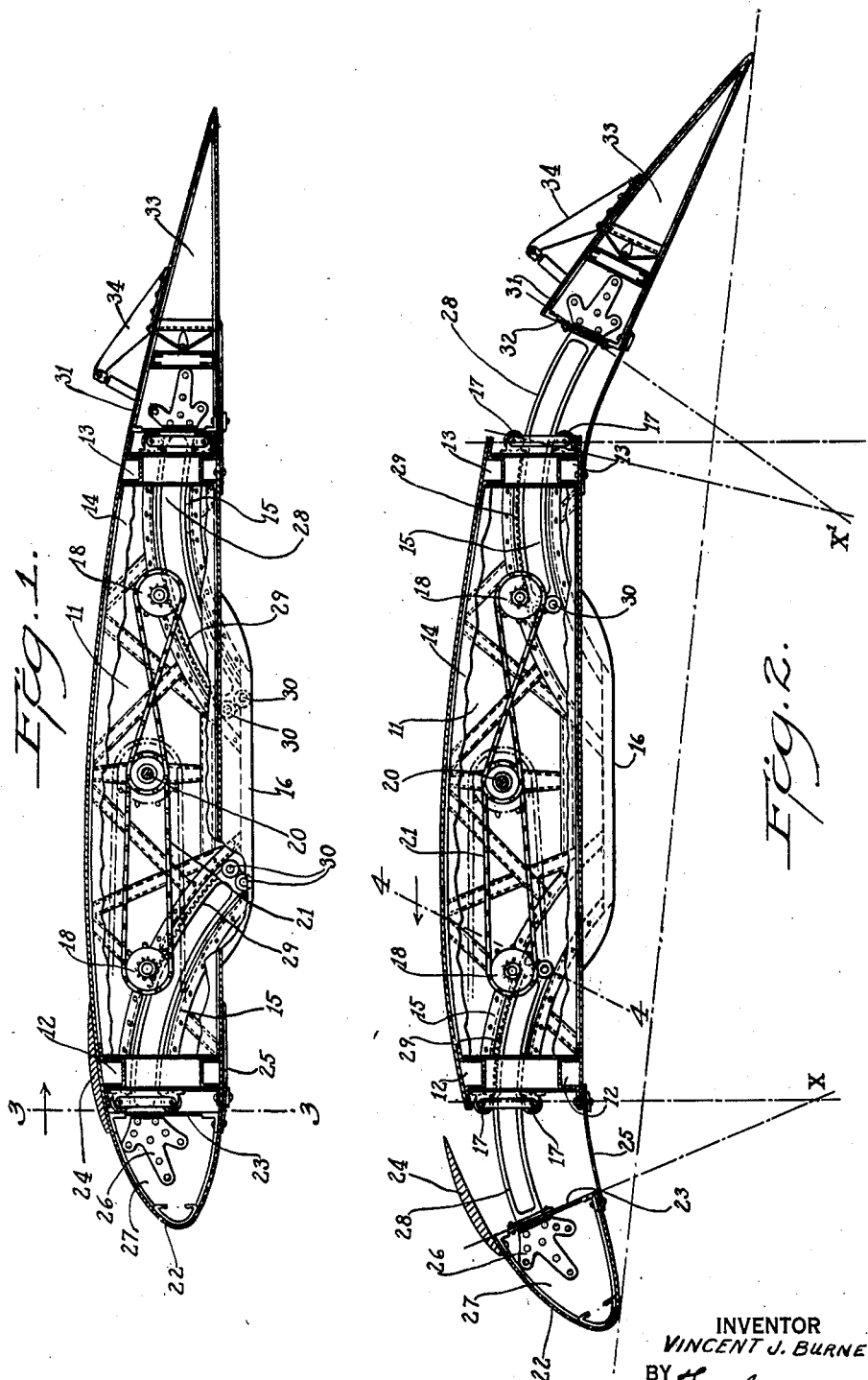

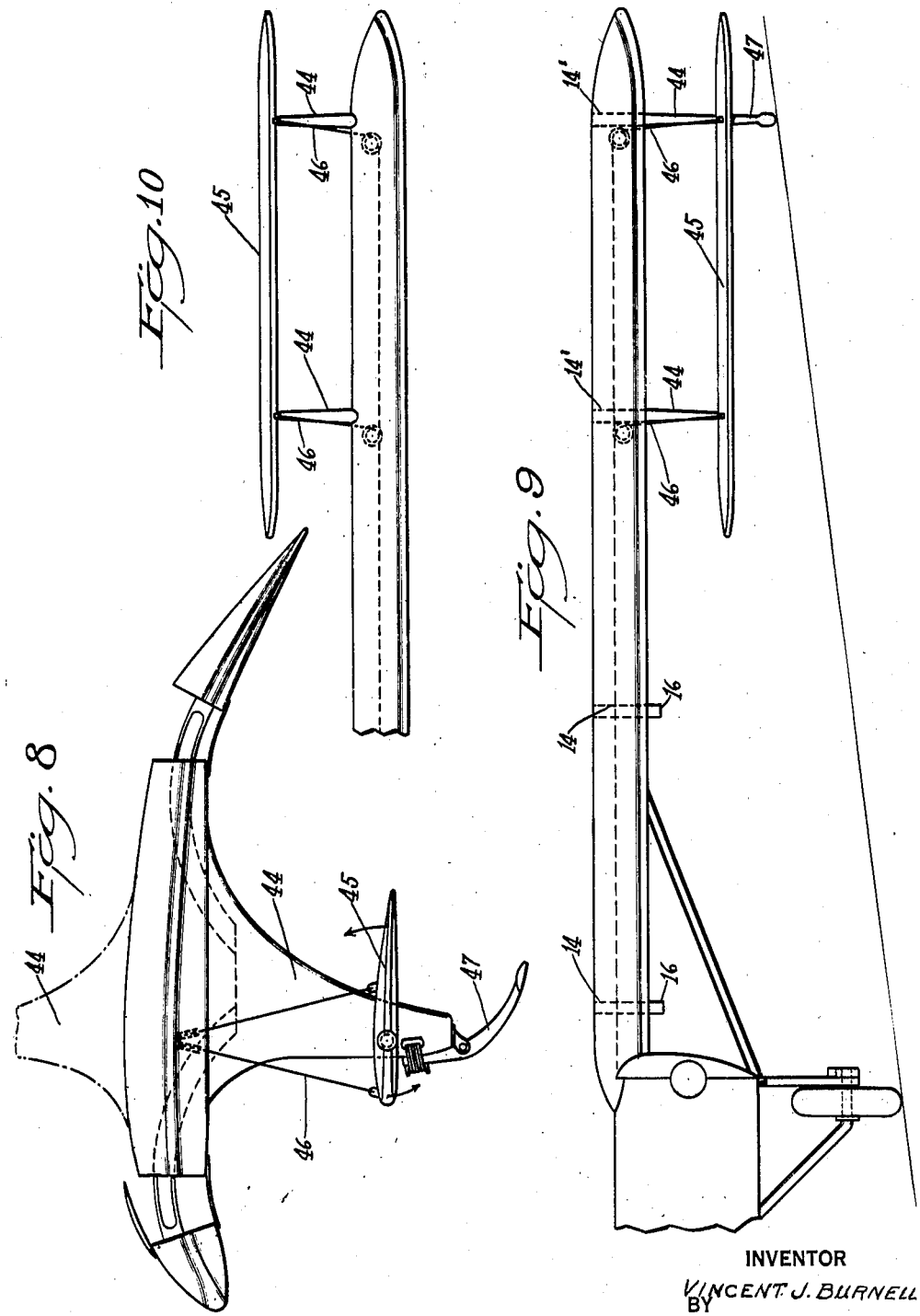

Patented July 11, 1933

1,917,428

UNITED STATES PATENT OFFICE

VINCENT J. BURNELLI, OF NEW YORK, N. Y., ASSIGNOR, BY DIRECT AND MESNE ASSIGN-
MENTS, TO THE UPPERCU-BURNELLI CORPORATION, A CORPORATION OF DELA-
WARE

AIRCRAFT

Application filed December 17, 1927, Serial No. 240,850. Renewed November 23, 1932.

This invention relates to aircraft, with particular reference to airfoils.

Among the objects of the invention are; to provide an airfoil with separate entering or trailing edge sections telescopically associated with the main body of the airfoil and extensible therefrom so as to simultaneously vary the chord and camber of the airfoil; to provide an airfoil of improved construction with extensible members housed in the structural members of the airfoil so that the strength of the airfoil is not adversely affected by the extensibility of the parts; to mount a straight, curved or arcuate track for an extensible arm in a compression member of an airfoil without affecting the strength of such member; to provide an airfoil with an adjustable entering edge section whereby the chord and camber of the airfoil are varied simultaneously, with means mounted on such edge section for varying the frontal area of the airfoil so as to vary the magnitude of airflow over the back of the airfoil as a further element in the variation in lift derived from the variation in chord and camber; to provide an interspar wing member with vertical prolongations to strengthen the member; to provide auxiliary control surfaces in an airplane vertically of the main wing thereof; to support auxiliary control surfaces on vertical extensions of interspar members of a main airfoil, with the auxiliary control surfaces disposed within the extended boundaries of the main airfoil; to provide in an airfoil a compression rib internally housing a track for a telescopic member of the airfoil, the rib extended vertically beyond the surface of the airfoil to form a pivotal support for an auxiliary control surface; to provide a vertical extension of an interspar member of an airfoil as a support for a ground or water contact element; and many other objects and advantages as will become more apparent as the description proceeds.

In carrying out the invention in one preferred form, a central section of an airfoil is provided, having longitudinal spars, with interspar cross-members at intervals therein, certain of the cross-members housing tracks and operating mechanisms in juxtaposition thereto, detached entering and trailing edge sections are provided with arms telescopically mounted in the tracks for operation by the mechanisms, the tracks if curved having substantially the same radii, but the trailing edge section being joined to the central section at a point off-set from the center of rotation of the track so that for a given outward movement the trailing edge section is depressed more than it is extended so that the angle assumed by the trailing edge section to the central section is greater than that of the entering edge section, so that the trailing edge section is swung downwardly out of the descending air stream normally impinged thereon at slow speeds and high angles of attack. In a further provision of the invention auxiliary ailerons are mounted in substantial alignment vertically with the center of pressure of the main wing and initially set at a divergent angle from the main wing so that at high angles of attack when the normal ailerons are ineffective the auxiliary ailerons may still be effective.

In the accompanying drawings,

Fig. 1 represents a vertical section through an assembled airfoil of this invention, with the parts in close association to effect a low lift-high speed airfoil.

Fig. 2 represents a section through the same airfoil with the parts extended for high lift-slow speed, by an increase in the chord and camber, with the trailing edge lowered or depressed further than the entering edge, Fig. 3 represents a section on line 3—3 of Fig. 1, Fig. 4 represents a section on line 4—4 of Fig. 2, to show a section through the compression rib and the track, Fig. 5 represents a fragmentary lateral section through the central section and the trailing edge section, showing the adjustable operating mechanism for an aileron, Fig. 6 represents a detail of the same, Fig. 7 represents a fragmentary vertical section through the central section compression or other rib, with the arcuate track and arcuate arm disposed therein, Fig. 8 represents a side elevation of an airfoil according to the invention with an auxiliary aileron mounted on a vertically extended projection of an interspar member, below the main airfoil in full lines, and with dotted lines indicating the alternative direction of projection above the main airfoil, Fig. 9 represents a front elevation of an airfoil and a portion of the fuselage disclosing the auxiliary aileron of Fig. 8, and its relation to the main airfoil, and Fig. 10 represents a front elevation of a fragmentary portion of an airfoil with the auxiliary aileron disposed vertically thereabove.

The airfoil comprises a central supporting section 11 having longitudinally extending spars 12 and 13, and the front and rear thereof respectively, which spars are trussed with fore and aft ribs, of which there are at intervals boxed or otherwise strengthened compression ribs 14. It is preferred that the compression ribs be the housing for the structures to be described, but it will be obvious that ordinary ribs may be used, or that extra cross members may be availed of for the purpose, any of which are included in the term "interspar member". In desirable interspar members arcuate tracks 15 are mounted extending from the faces of spars 12 and 13 respectively inward and downward in the rib, and reinforced in the rib by suitable bracing. In a thick wing the tracks may terminate above the lower surfaces of the wing, and in a semi-thick wing as shown in Fig. 1, the inner edges of the track may extend below the normal line of the rib and boxed in a reinforcing streamlined compartment or housing 16 as shown. Upper and lower guide rollers 17 are mounted on the face of the spars 12 and 13 adjacent the outer end of the tracks. Suitable driving mechanism, such for instance as a sprocket 18 is disposed within the compression rib extending into the track and driven by suitable gearing, such as a shaft 20, and chains and pulleys 21, all disposed within the central supporting section 11.

An entering edge section 22 having a spar 23 arranged for close association with the spar 12 of the central section, is provided, having a tangential rigid deflector 24 extending beyond the rear face of the entering edge section, and arranged to lie substantially flat upon the forward upper surface of the central section when in retracted position. The covering skin 25 of the entering edge section is preferably prolonged at the lower surface in any desired manner to form an extensible continuous skin with the lower surface of the central section so as to prevent the passage of air between the central and entering edge sections regardless of the closeness or remoteness of the adjusted relation.

Rigidly affixed to the entering edge section, as by a plate 26 bolted to a rib 27 thereof, is an arcuate arm 28, which may be an I beam in cross section, carrying at its extremity a pair of rollers 30 arranged for guiding rotative association with the upper and lower surfaces of the arcuate track 15, which arm carries a rack 29 or other mechanism arranged for meshing with the sprocket or other gear 18 of the track. It will be understood that there will be arms 28 at intervals on the entering edge section so that there is an arm for each track, disposed for instance in compression ribs located every six feet of the wing, for a purely illustrative example.

A trailing edge section 31 having spar 32, carries preferably curved or arcuate arms 28', in the same manner that arms 28 engage the entering edge section, and preferably of the same construction, having each a rack 29', and rollers 30'. The arms telescope in the registering tracks of the central section as will be clear, and are actuated by the same mechanism as is the entering edge section, so that both sets of arms are extended and retracted simultaneously, but with a different degree of amplitude, preferably, so that there is a greater movement of the trailing edge section. It is of importance however, to note that whereas the axis of rotation of the curved track and arm of the entering edge section, indicated at X in Fig. 2, is preferably substantially in the plane of the meeting faces of the entering and central sections, so that the entering edge section moves substantially tangent to an arc, yet the trailing edge section is preferably off-set relative the axis of rotation of the curved track and arm thereof, so that the plane of their meeting faces is out of registry with the axis, as indicated at X', in Fig. 2. It will be clear that the positions of axes and planes of meeting faces and the radii of the curvature of the tracks may all be varied as desired. It is preferred that the movement of the two sets of arms in the sets of tracks be synchronized, but that the trailing edge section be imparted a greater amplitude of movement in order to prevent center of pressure variations on the airfoil.

It has been discovered that in varying the chord and camber normally, so that each is high, and with a high angle of attack, the air stream diverted upwardly over the wing bends directly down upon the trailing edge thereof with a consequent nullifying of an appreciable amount of lift. With the arrangement shown however, the air stream is directed upwardly over the entering edge section, while the trailing edge section is swung down so far that the air stream sweeps over the trailing edge maintaining a vacuum on that as well as on the central section, so that the effective lift is a maximum. Moving the entering edge section on a tangent secures a greater increase in area, where effective, at front of airfoil, with a small degree of angular change relative the chord, while the trailing edge section starts its movement at a point off-set from the perpendicular of the axis, so that with a small increase in area there is a decided and appreciable angular change relative the chord. This synchronized but different adjustment of the edge sections on the central section effects but little change in the center of pressure on the airfoil, but is of importance in securing the benefits derivable from changes of chord and camber in flight.

The flow of air over the top of the airfoil at high speeds upon an airfoil as shown Fig. 1 is clear, but with the slower speeds available from the wing section of Fig. 2, the divergence from the entering edge may not be as pronounced as it may be if the most efficient flight is to be had, in view of which the deflector shown in Figs. 1 and 2 is used, to increase the frontal area of the airfoil over what it would be without the deflector, to cause the airstream to be impelled upward further over the entering edge, so that when it curves downwardly it will be well over the trailing edge.

It is contemplated that with a pair of airfoils extending laterally from a fuselage or body, that lateral stability may be secured by coordinating the mechanisms for varying the chord and camber in such manner that the lift on one airfoil will be accompanied by a decrease of lift on the other for control purposes. However, for general purposes ailerons will be provided as shown in Figs. 1, 2, and 5.

In the trailing edge section 31, ailerons 33 are pivoted, having a horn 34 connected by a link 35 to a crank arm 36, mounted in a bearing in the spar 32 of the trailing edge section, the crank arm connected through universal joint 37 with an angular rotatable shaft 38, extending through the spar 13 of the central section 11, and through an angularly slotted coupling 40, mounted pivotally in a journal 41 mounted on spar 13, which coupling has a crank arm 42 movable by a rod 43 extending longitudinally of the central section. It will be clear that the trailing edge section may be moved from and towards the central section, and through the angular sliding arrangement of the shaft 38 and the coupling 40, will always be susceptible to control through movement of the rod 43, effecting movements of the ailerons.

It has been found that when an airfoil has a high angle of attack, the normal ailerons, disposed in the trailing edge, are of but little use for controlling the lateral stability of the aircraft. This factor is of course, well known, but so far as known no practicable solution has been provided for the problem presented in ordinary ailerons.

It is a part of this invention to provide auxiliary control surfaces vertically of the main airfoil, either above or below same, in the manner, and with the functions, to be described.

In the airfoil previously described, desirable interspar members, or compression ribs housing the tracks and arms of the adjustable edge sections, or simple compression or other ribs serving no other purpose than as structural elements of the wing, are provided. Such a compression rib as 14', comprising a box structure, is continued vertically in a strut 44 extending beyond the surface of the main airfoil, either downwardly as shown in full lines as shown in Fig. 8, or in Fig. 9; or upwardly as indicated in dotted lines in Fig. 8, or shown in Fig. 10.

The strut 44 is streamlined as may be found expedient, and the main portion of the strut is positioned as desired relatively to the main wing portion, possibly in substantial alignment with the center of pressure, or forward thereof. This is so disposed as to minimize the torque on the main airfoil incident to pressure on the auxiliary aileron to be described. There are preferably two of these struts provided, to which are pivoted a relatively long and narrow aileron 45, controlled through cables 46, or other devices extending into the main wing or airfoil. It is preferred that each aileron be pivoted to the struts at a point slightly in advance of the center of pressure thereon, so that there will be some appreciable reaction to the controls in the hands of the pilot.

Possibly some experimentation will be necessary to effect the angle of attack of the aileron which works out best with the angle of incidence of the main airfoil, but it is contemplated that the aileron will be normally set at a minus angle to the line of flight, which normal angle may be manually variable, if the main airfoil is set at zero or some positive angle, whereby if the angle of attack is high when attempting high lift with slow speed, when normal ailerons would be ineffective, the auxiliary ailerons will be at such an angle to the airstream as to secure a maximum response to actuation on their pivots.

It is part of the invention to so proportion the aileron and so space it relative the main wing that the airstream diverted or deflected by the main wing will sweep down, or up, as the case may be to an extent to put pressure on the auxiliary aileron, and increase its efficiency.

The struts of this invention, comprising extensions of interspar members, are used not only to support ailerons if desired, but may be used as shown in Figs. 8 and 9, to support a wing skid 47, or a wing float or pontoon of a flying boat, (not shown).

In addition to the advantages secured by this invention in variations in lift, etc., it is pointed out that the improvements in structural details are important, and that a thoroughly practical construction is set forth.

It will be noted that there are three factors contributing to increased lift with the structure disclosed; the increase in chord and camber of the airfoil, the greater deflection of the trailing edge to move it out of the path of the descending air stream, and the increase in the frontal area of the airfoil secured by the deflector disclosed.

It will be clear that the disposition of strain imparting extensible members in guides in interspar members of an airfoil is a feature of much greater range of applicability than the single disclosure illustratively included herein, not being limited to devices for increasing the chord and camber, and such extended use of the invention is contemplated as recited in the appended claims.

I claim as my invention:

1. In an airfoil, a central section comprised of and terminating in front and rear main spars, and a lateral compression rib, said rib comprised of spaced rigid vertical elements abutting and rigidly engaging the spars with the spars and said rib being of substantially identical vertical extent at their abutting junction, a hollow track disposed in the compression rib terminating in an opening in the spar, guide rollers disposed near the opening of the track, an arm disposed in the hollow track, rollers near an end of the arm bearing against the inner surfaces of the track, means for moving the arm in the track, and an edge section rigidly mounted on said arm.

2. In an airfoil, spars, and an interspar hollow compression member, said member comprising substantially parallel rigid spaced vertical members abutting and rigidly engaging the spars and of substantially the same vertical extent as said spars at their abutting junction, a track rigidly disposed in the hollow compression member, a strain imparting arm slidable in the track, strains from the arm passing into the compression member and thus into the spars.

3. In an airfoil of normally low lift and high speed, means for increasing the lift in flight, comprising means for increasing the chord, the camber, and the frontal area of the airfoil to an extent greater than is incident to the charge in camber.

4. In an airfoil a central section, an entering edge section, means for moving the entering edge section outwardly and downwardly from the central section so as to increase the chord and camber of the airfoil, and means mounted on the entering edge section extending beyond the rear edge thereof arranged to extend above the central section when the entering edge section is moved to increased the frontal area of the airfoil to an extent greater than is incident to the change in camber and increase the rarefaction above the central section.

5. In an airfoil, a central section including spars and interspar members and terminating at the front and rear respectively in a spar, an internally surfaced track disposed in a member, a spar having an opening in registry with the track, rollers positioned near the opening in said spar, and an arm carrying rollers and a rack telescopically disposed in the track and guided by the first mentioned rollers, an edge section mounted on the arm, and gear mechanism meshing with the rack for positively extending and retracting the arm to vary the relationship of the edge section and the central section.

6. In an airfoil, a central section including spars and interspar members, oppositely disposed arcuate tracks disposed in a member terminating in the respective spars, an entering edge section arranged to contact with the central section in a plane passing substantially through the axis of curvature of said track, an arm supporting the section and disposed in the track and having a similar curvature; a trailing edge section arranged to contact with the central section in a plane off-set from the axis of curvature of said track, an arm supporting the trailing edge section and disposed in the track, means for extending the arms in the track simultaneously, the arrangement being such that the given movement extends the entering edge section from the central section with a minimum angular change, and the same degree of movement extends the trailing edge section away from the central section with an appreciably greater angular change.

7. In an airfoil, a central section including spars and interspar structural members and terminating at the rear in a substantially vertical surface of a spar, an arcuate track disposed in an interspar member, a trailing edge section having a vertical front edge arranged for contact with the central section in such manner that the vertical surface and edge are in closely spaced substantially parallel relation off-set from the axis of curvature of the track, an arcuate arm supporting the trailing edge section and disposed in the track, and means for extending and retracting the arm in the track, the eccentric disposition of the trailing edge section securing a magnified angular change in the relationship of the central and trailing edge sections.

8. In an airfoil, spars, and an interspar member of box construction and comprising parallel, spaced, rigid vertical members, said elements being extended vertically beyond the surface of the airfoil in a streamlined housing the front and rear edges of which are spaced inwardly vertically of the spars.

9. In an airfoil, spars, interspar members of box construction, arcuate tracks disposed in a member, arcuate arms disposed in the tracks, edge sections mounted on the arms, said box construction extending beyond the surface of the airfoil, and an aileron pivoted to the extension.

10. In an airfoil, a compression rib extended vertically of the surface of the airfoil, an auxiliary control surface or aileron pivotally mounted on the extension of said compression rib in vertical spaced relation to said airfoil.

11. In an airplane, an airfoil having spars and interspar members, a plurality of the interspar members being extended vertically of the surface of the airfoil, an auxiliary aileron pivoted on the extensions in vertically registering spaced relation to the airfoil.

12. In an airfoil, a central section and an adjustable trailing edge section susceptible to horizontal movements, an aileron pivoted to the section, means for oscillating the aileron including a rotatable angular shaft extensible with the trailing edge section, and a coupling in the central section, through which the angular shaft may slide.

13. In an airfoil, a compression rib of box construction, an arcuate track vertically delineated by spaced transverse arcuate members boxed into the rib, and laterally delineated by the boxing of the rib, the airfoil having spars with which the rib is rigidly connected in abutting relation.

14. In an airfoil, a pair of spaced spars having vertical faces, interspar members including a compression rib formed of a pair of vertical elements in parallel spaced relation abutting the vertical faces of the spars and rigidly connected thereto, transverse bracing for the compression rib comprising spaced flanged transverse elements rigidly connected to the vertical members and defining with the portions of the vertical members between the transverse elements a guide channel.

15. In an airfoil, spars, and transverse compression members abutting and extending between the spars, certain compression members comprising a pair of horizontally spaced vertically extending rigid elements immovably engaging the spars, internal bracing for the compression member comprising a transverse arcuate element in rigid engagement with each of the rigid vertical elements.

16. In an airplane, an airfoil including spars in spaced relation having vertical faces in sub-parallelism, one spar having an opening, a compression rib comprising a pair of rigid vertical plates of substantially the height of the spars abutting the internal faces of the spars and rigidly connected thereto in rigid spaced relation on each side of said opening, a pair of arcuate elements spaced vertically of the opening and having oppositely disposed flanges, the flanges rigidly engaging the side plates, and the arcuate elements forming a track and defining with the side plates, a closed channel registering with the opening, and an arm slidable in the channel.

Signed at Philadelphia, county of Philadelphia, State of Pennsylvania, this 14th day of December, 1927.

VINCENT J. BURNELLI.